United States Patent
Grand et al.

(10) Patent No.: US 8,314,595 B2
(45) Date of Patent: Nov. 20, 2012

(54) BATTERY EQUALIZATION USING A PLUG-IN CHARGER IN A HYBRID ELECTRIC VEHICLE

(75) Inventors: Kerry E. Grand, Chesterfield, MI (US); Venkatapathi R. Nallapa, West Bloomfield, MI (US); Fazal U. Syed, Canton, MI (US); Ming L. Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 823 days.

(21) Appl. No.: 12/480,952

(22) Filed: Jun. 9, 2009

(65) Prior Publication Data

US 2009/0250277 A1   Oct. 8, 2009

Related U.S. Application Data

(63) Continuation-in-part of application No. 11/652,899, filed on Jan. 12, 2007, now Pat. No. 7,567,061.

(51) Int. Cl.
*H02J 7/04* (2006.01)
*H02J 7/16* (2006.01)
*H02J 7/00* (2006.01)

(52) U.S. Cl. ........ 320/132; 320/104; 320/149; 320/162; 903/906; 903/907

(58) Field of Classification Search .................... 320/132
See application file for complete search history.

(56) References Cited

U.S. PATENT DOCUMENTS

| 5,081,365 | A  | 1/1992 | Field et al. |
| 5,631,532 | A  | 5/1997 | Asuma et al. |
| 5,659,240 | A  | 8/1997 | King |
| 6,559,621 | B2 | 5/2003 | Corless et al. |
| 7,053,588 | B2 | 5/2006 | Nakanishi et al. |
| 2006/0022639 | A1 | 2/2006 | Moore |
| 2006/0033475 | A1 | 2/2006 | Moore |
| 2006/0132085 | A1 | 6/2006 | Loubeyre |
| 2006/0152189 | A1 | 7/2006 | Ambrosio et al. |

*Primary Examiner* — Edward Tso
*Assistant Examiner* — Ahmed Omar
(74) *Attorney, Agent, or Firm* — David B. Kelley; MacMillan, Sobanski & Todd, LLC

(57) ABSTRACT

In a hybrid electric motor vehicle, a power supply system for storing and supplying electrical power includes a motor-generator located onboard the vehicle, driveably connected to the vehicle wheels and producing AC electric power, an energy storage device for alternately storing and discharging electric power, an inverter coupled to the motor-generator and the energy storage device for converting alternating current produced by the motor-generator to direct current transmitted to the energy storage device, and for converting direct current stored in the energy storage device to alternating current transmitted to the motor-generator, an off board source of AC electric power located external to the vehicle, and a charger coupled to said electric power source and the energy storage device for supplying DC electric power to the energy storage device from said AC electric power source.

12 Claims, 2 Drawing Sheets

BATTERY EQUALIZATION USING A PLUG-IN CHARGER IN A HYBRID ELECTRIC VEHICLE

This application is a continuation-in-part of U.S. application Ser. No. 11/652,899, filed Jan. 12, 2007 now U.S. Pat. No. 7,567,061.

BACKGROUND OF THE INVENTION

1. Field of the Invention

The preferred embodiment relates generally to an electric power supply system and method for charging an electric storage battery of a hybrid electric vehicle.

2. Description of the Prior Art

The powertrain of a hybrid electric vehicle includes multiple power sources, an internal combustion engine (ICE), principally used when highway speeds are sustained; an electric motor for charging electric storage batteries; and a traction motor for launching the vehicle, i.e., for accelerating the vehicle from a stopped condition.

Generally, when using sealed lead acid batteries, which are also called power batteries, a constant voltage charge method is the preferred means for charging battery cells. Under a constant voltage regime currents are limited by the internal resistance of the battery. When the battery is in a low state of charge and the internal resistance is low, in-rush currents can be very large and energy can be restored to the battery very quickly. As the battery becomes charged, it reaches a transition point where a sudden rise in internal resistance occurs and, under constant voltage, the battery will accept less and less current. This self-regulating effect prevents overcharging of the battery, leading to longer battery lifetimes. Such constant voltage charge regimes are conducted at an equalization voltage, which is the recommended voltage at which the batteries can be maintained at a high state of charge (SOC).

After this transition a low current equalization charge is required to return the complete capacity of the battery and to ensure that the individual cells within the battery are brought to an approximately equal charge state.

Most of the charging and discharging of the battery is done in a bulk region below the transition point.

Conventional hybrid electric vehicle powertrains on the other hand use energy batteries, such as NiMH or Li-ion batteries, where the battery charging and equalization is performed through an electric motor driven by the ICE as a battery charger. Since these batteries are composed of many individual cells connected to form high-voltage configuration, charging or discharging these batteries during normal vehicle operations can result in individual cells being at different voltages or state of charge, thereby resulting in unbalanced individual cells. Control of the balancing these individual cells through an equalization process is difficult due to the mismatch in power ratings of the electric motor-ICE combination and the battery power required to perform a precise equalization of the storage battery. Therefore, individual cells balancing in such powertrain requires sophisticated systems and methods in the equalization process.

With the advent of plug-in hybrid electric vehicle powertrains, there are two source available for charging and equalization of these batteries, first source being onboard power source (ICE) and the second source being the off board power source (plug-in charger).

The availability of two power sources, one being onboard and the other being off board, provides for opportunities for improving charging cost and better equalization of battery. There is a need in the industry for such a system and method that provides a mechanism for determining appropriately the charging and equalization of a storage battery in a hybrid electric system using both onboard the vehicle and off board the vehicle power sources. This system and method can determine customized battery power profiles in a hybrid electric powertrain system to improve battery charging and equalization for a vehicle with a plug-in charger together with the ICE.

SUMMARY OF THE INVENTION

A power supply system for storing and supplying electrical power in a hybrid electric vehicle, includes a motor-generator driveably connected to vehicle wheels for producing AC electric power, an energy storage device for storing and discharging electric power, internal combustion engine, a source of AC electric power located external to the vehicle, a charger coupled to said electric power source and the energy storage device for supplying DC electric power to the energy storage device from said electric power source, and a controller configured to use a state of charge of the energy storage device and a base electric power profile having regions relating electric power and said state of charge, and to use the motor-generator and internal combustion engine to provide a bulk charge to the energy storage device in accordance with the base electric power profile and a current state of charge.

The energy storage battery being charged by the system is equalized very infrequently, perhaps every three to four months. The electric storage system employs only one storage battery, no second electric storage battery, which would add unnecessary weight to the system and vehicle, is required in addition to the storage battery being charged. A second storage battery external to the vehicle would add cost, lower system charge efficiency, and double the equalization problem because it must be charged periodically.

The energy storage device has the flexibility of being replenished by the ICE or a source external to the vehicle, such as the electrical utility power grid.

The ICE may continue to operate and provide energy to drive a load up to a certain state of charge, after which the utility power grid supplies energy to the storage battery.

Advantages of the plug-in device and system include precise equalization of the battery efficiently, optional choice of the energy source ICE or public utility grid, and more flexibility in cost optimization for charging the battery. These advantages drive the design of the hybrid architecture including the size of the charger, charge integration and battery charge topology.

One of the advantages is the precise equalization of the battery through optimal determination of battery power from the on board power source, electric machine /ICE, and the off board power source, the plug-in charger. Using customizable battery power an on board power source, electric machine /ICE, can be used to bring the battery pack quickly to a high (about 90%) SOC, then a plug-in charger can be used to perform precise battery pack equalization. Such a method of battery pack equalization can provide very precise balancing of individual cells in a battery pack which is fairly impossible using just an on board power source of electric machine /ICE.

Another advantage is the flexibility in cost optimization for charging the battery through optimal determination of battery power from the on board power source, electric machine /ICE, and the off board power source, the plug-in charger.

Use of alternate power sources, the electric machine and ICE separately or in combination and an external power source, provide control flexibility toward optimizing cost associated with each of the power sources. For example, when fuel prices are relatively low compared to the cost of the external power source, the ICE would be used to provide the bulk charge of the energy storage device, i.e., to charge the battery pack to the high SOC, and the external power source and charger would be used for the equalization charge, i.e., from a high SOC to a maximum (about 100%) SOC. But when fuel costs rise relative to those of utility power source, the ICE would be used to provide a bulk charge to the energy storage device that is proportionately lower than the high SOC, and the external power source and charger would be used for an equalization charge that is proportionately greater than a low (about 10%) SOC.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
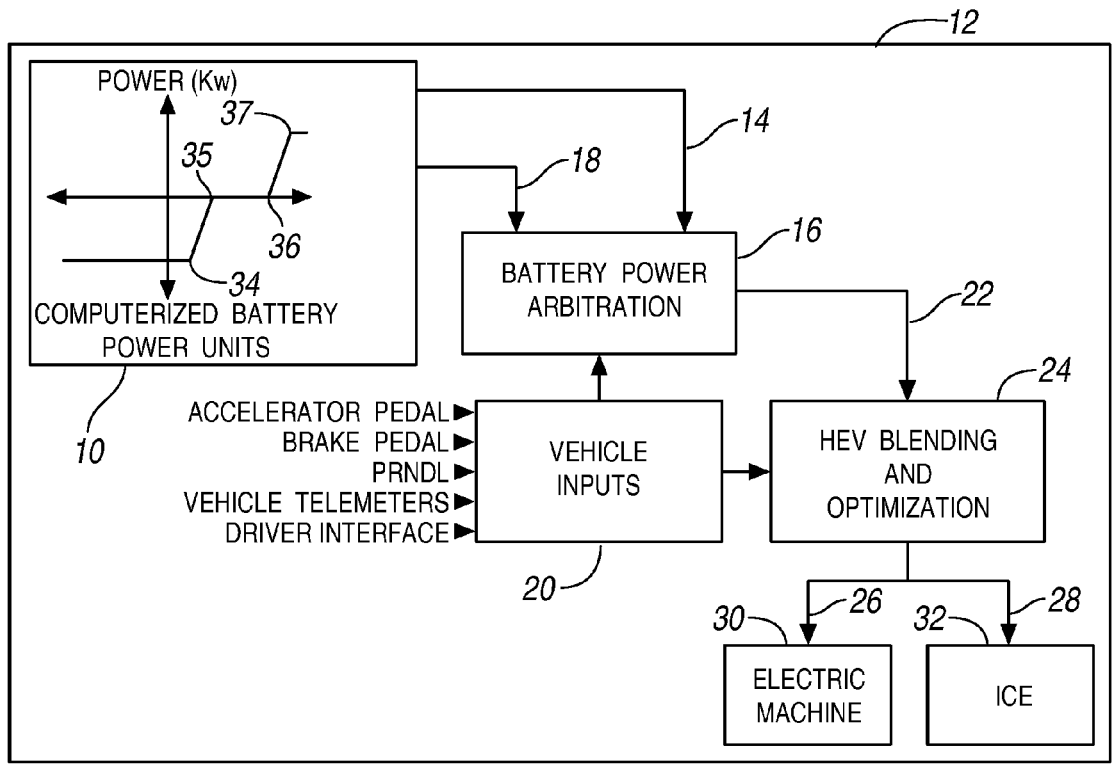
FIG. 1 is schematic diagram of a hybrid electric vehicle battery power control system.

Turning first to FIG. 1, a piecewise linear transfer function 10, stored in electronic memory accessible to a controller 12, relates the state of charge (SOC) of an onboard electric storage battery to the magnitude of power produced by the battery, i.e., the battery power request 14. A battery power arbitration control algorithm 16 receives input signals representing the current battery power request 14, current battery internal parameters (such as SOC, battery temperature, internal resistance, open circuit voltage) 18, and various vehicle inputs 20, including accelerator pedal position, brake pedal displacement, the position of the gear selector lever or PRNDL, the current degree of vehicle telematics usage, and driver interfaces. The algorithm 16 produces as its output a signal representing an arbitrated desired battery power 22. In response to input signals representing vehicle inputs 20 and the arbitrated desired battery power 22, a hybrid electric vehicle (HEV) blending and optimization algorithm 24 produces output command signals 26, 28, which are used as input to an electric machine 30, and an internal combustion engine 32 (ICE), which signals are used optimally to charge an energy storage device, such as an electric storage battery, using the two power sources 30, 32.

The battery power request 14 is a dead band piecewise linear function consisting of four points: a battery power lower saturation limit 34, a zero point lower saturation limit 35, a zero point upper saturation limit 36, and a upper point batter power upper saturation limit 37.

Figure 2:
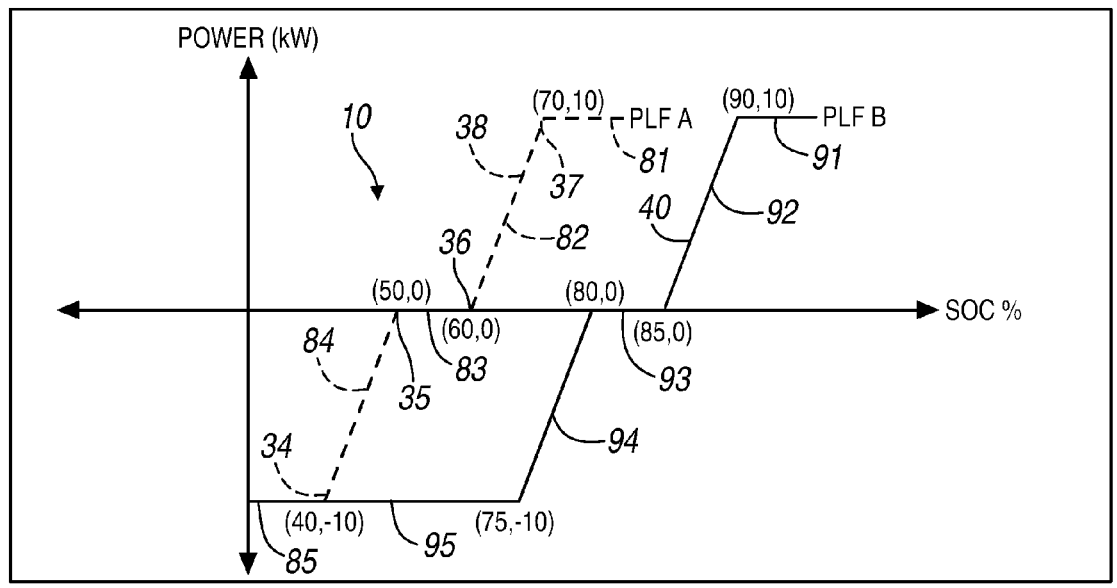
FIG. 2 is the transfer function shown in FIG. 1 relating battery SOC and the battery power request.

FIG. 2 illustrates an example of the battery power request transfer function 10 before any changes (PLF A) 38 and after the electric motor/ICE charges the battery pack during the drive cycle PLF B) 40. In this way, the magnitudes of the variables represented by the four points 34-37 of the transfer function are modified during the drive cycle using a battery charger. For the illustrated example, the system used to modify the battery power request shifts transfer function 38 rightward to the position of transfer function 40, thereby allowing the vehicle to remain at a higher SOC capacity prior to recharge.

Transfer function (PLF A) 38 has a power-SOC profile, which is divided into five regions 81-85 comprising: (i) a base fast active discharge region 81 beginning at the point having coordinates (70,10) and extending parallel to the SOC axis; (ii) a base increasing active discharge region 82 extending along an ascending ramp between coordinates (60,0) and (70,10); a base opportunistic passive discharge region 83 extending parallel to the SOC axis between coordinates (50, 0) and (60,0); a base increasing active charge region 84 extending along an ascending ramp between coordinates (40,−10) and (50,0); and a base fast charge region 85 extending parallel to the SOC axis and terminating at the point whose coordinates are (40,−10).

Controller 12 prevents the motor-generator 30 and internal combustion engine 32 from charging the energy storage device 56 when the region of operation in the base electric power profile 38 is the fast discharge region 81.

Controller 12 minimizes use of the motor-generator 30 and internal combustion engine 32 for charging the energy storage device 56 when the region of operation in the base electric power profile 38 is the increasing active discharge region 82.

Controller 12 prevents the motor-generator 30 and internal combustion engine 32 from discharging the energy storage device 56 when the region of operation in the base electric profile 38 is the fast charge region 85.

Controller 12 minimizes use of the motor-generator 30 and internal combustion engine 32 for discharging the energy storage device 56 when the region of operation in the base electric power profile 38 is the active charge region 84.

Controller 12 uses the motor-generator 30 and internal combustion engine 32 for discharging and charging the energy storage device 56 when the region of operation in the base electric power profile 38 is opportunistic passive discharge region 83.

Controller 12 uses a modified five-region electric power-SOC profile 40 that shifts the base five-region electric power profile 38 rightward to relatively high state of charge when the vehicle is being driven and high-voltage battery cell voltage equalization, i.e., balancing, is required needed.

The modified transfer function (PLF B) 40 has a power-SOC profile, which is divided into five regions 91-95 comprising: (i) a modified fast discharge region 91 beginning at the point having coordinates (90,10) and extending parallel to the SOC axis; (ii) a modified increasing active discharge region 92 extending along an ascending ramp between coordinates (85, 0) and (90,10); (iii) a modified opportunistic passive discharge region 93 extending parallel to the SOC axis between coordinates (80, 0) and (85,0); (iv) a modified increasing active charge region 94 extending along an ascending ramp between coordinates (75,−10) and (80,0); and (iv) a modified fast charge region 95 extending parallel to the SOC axis and terminating at the point whose coordinates are (75,−10).

Controller 12 prevents the motor-generator 30 and internal combustion engine 32 from charging the energy storage device 56 when the region of operation in the modified electric power profile 40 is the fast discharge region 91.

Controller 12 minimizes use of the motor-generator 30 and internal combustion engine 32 for charging the energy storage device when the region of operation in the modified electric power profile 40 is the increasing active discharge region 92.

Controller 12 prevents the motor-generator 30 and internal combustion engine 32 from discharging the energy storage device 56 when the region of operation in the modified electric power profile 40 is the fast charge region 95.

Controller 12 minimizes use of the motor-generator 30 and internal combustion engine 32 for discharging the energy storage device 56 when the region of operation in the modified electric power profile 40 is the increasing active charge region 94.

Controller 12 uses the motor-generator 30 and internal combustion engine 32 for discharging and charging the energy storage device 56 when the region of operation in the modified electric power profile 40 is the opportunistic passive region 93.

The method further (i) activates the plug-in charger-based energy storage device equalization when the vehicle is off; (ii) activates the plug-in charger based energy storage device equalization when the charger is electrically connected to the high voltage AC electric power source by being plugged-in; (iii) activates the plug-in charger-based energy storage device equalization when the region of operation in the modified electric power profile 40 is the increasing active discharge region 93 or the fast discharge region 91; and (iv) provides the plug-in charger-based equalization charge to the energy storage device 56 when the region of operation in the modified electric power profile 40 is the increasing active discharge region 94 or the fast discharge region 91 while energy storage device equalization is being performed.

If several requests for plug-in based energy storage device equalization are unsuccessful, controller 12 (i) activates the engine based energy storage device equalization; (ii) activates engine-based energy storage device equalization when the region of operation in the modified electric power profile 40 is the increasing active discharge region 92 or the fast discharge region 91; and (iii) provides engine-based equalization charge to the energy storage device 56 when the region of operation in the modified electric power profile 40 is in the increasing active discharge region 92 or the fast discharge region 91 while energy storage device equalization is being performed.

Figure 3:
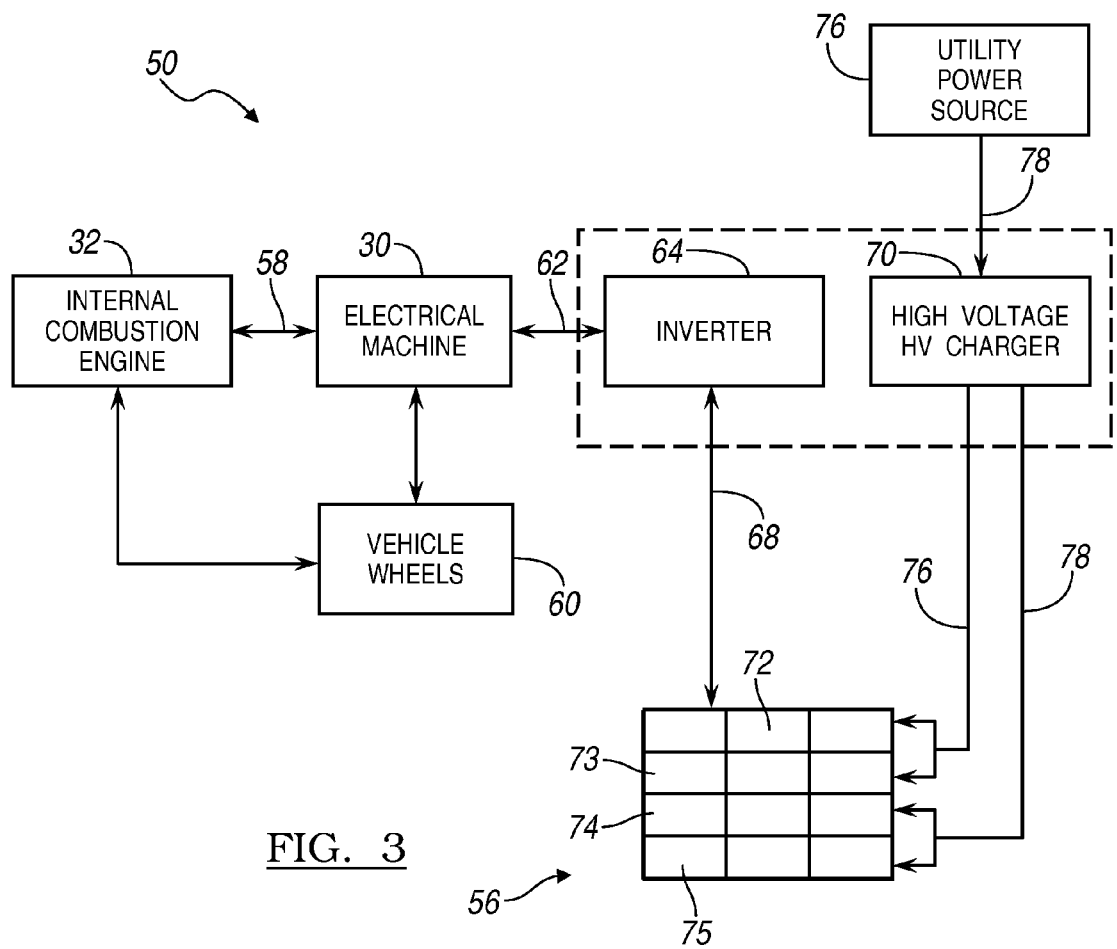
FIG. 3 is a schematic diagram showing a for the hybrid fuel cell/storage device system.

FIG. 3 illustrates schematically the architecture of a hybrid electric equalization system 50. Two power sources onboard the vehicle includes the ICE 32 and electric machine 30, which may be a starter-generator or motor-generator. The electric machine 30 is driveably connected to the vehicle wheels 60 through series and/or parallel drive connections. The ICE 32 may drive the electric machine 30 when it operates in a generator mode, and the ICE may drive the vehicle wheels 60. The electric machine 30 may operate in a starter mode to start the ICE 32, in a motor mode to drive the vehicle wheels 60, and in a generator mode to charge electrically an energy storage device 56. In the generator mode, the electric machine 30 may be driven by the vehicle wheels, by the ICE 32 and by these in combination.

The ICE 32 is either continually driveably connected by a mechanical interface 58 to the electric machine 30. The mechanical interface 58 may be a portion of the powertrain of the motor vehicle or a clutch, which can be alternately engaged and disengaged. The output of the electric machine 30 is connected through an electric interface 62 to a motor inverter 64.

The motor inverter 64 converts AC current produced by the electric machine 30 to DC current, which is supplied on line 68 to the energy storage device 56, and it converts DC current from the energy storage device to AC current, which is supplied on line 68 to the electric machine 62.

The energy storage device 56 may be an electric storage battery, a battery pack, capacitors, or a combination of a storage battery and capacitors. When the energy storage device 56 comprises battery packs, they may be arranged in battery pack groups 72, 73, 74, 75, which are interconnected in any combination including series, parallel, and series-parallel connections.

A high voltage (HV) charger 70 and the energy storage device 56 may share two different electric interfaces 76, 78, thereby allowing the storage device 56 to be split while being charged, if desired. In this way, current from the HV charger 70 may be divided or split among the groups of battery packs 72-75, which comprise the energy storage device 56. The HV charger 70 may be located onboard the vehicle, in which case it may be integrated with the inverter 64 or a separate unit from the inverter. Alternatively, the HV charger 70 may be located external to the vehicle.

In either case, power from a source 76 external to the vehicle, such as an electric utility grid, is electrically connected by a line 78 to the HV charger 70. The external power source may supply single phase or three phase AC current to the charger 70. The charger 70 converts current from source 76 to DC current, which is supplied on lines 72, 74 to the energy storage device 56. The HV charger can supply energy at a magnitude that either rebalances, i.e., fully recharges the energy storage device 56. A rebalancing charge is sometimes referred to as an equalization charge.

For the illustrated example of FIG. 2, the method used to modify the battery power request shifts curve 38 rightward allowing the vehicle to remain at a higher SOC capacity prior to recharge. This higher SOC provides operational flexibility, such as allowing the capacity of the charger 70 to be smaller, or the period required to perform an equalization charge of the energy storage device 56 to be shorter than they would be otherwise.

Use of alternate power sources, ICE 32 and external power source 76, provide control flexibility in precise equalization of the battery using both the power sources. For example, to perform precise equalization of battery, controller 12 controls the electric machine 30 and ICE 32, either separately or in combination, to quickly charge the energy storage device 56, i.e., to charge the battery pack to a high (about 90%) SOC and the controller uses the external AC power source 76 and charger 70 to provide the equalization charge very precisely, i.e., from the high SOC to a maximum (about 100%) SOC. Such a method of battery pack equalization results in very precise balancing of state of charge or voltage of individual cells in a battery pack which is fairly impossible using just the electric machine 30 and ICE 32 combination.

Again, use of alternate power sources, ICE 32 and external power source 76, provide control flexibility in optimizing costs associated with each of the power sources. For example, when gasoline or diesel fuel prices are relatively high compared to the cost of electric power from the AC external power source, controller 12 controls the electric machine 30 and ICE 32, either separately or in combination, to bulk charge the energy storage device 56, i.e., to charge the battery pack to a normal (about 50% to 60%) SOC, and the controller uses the external AC power source 76 and charger 70 to provide the rest of the charge, i.e., from the normal SOC to a high (about 90%) SOC. Similarly, when gasoline or diesel fuel prices are relatively low compared to the cost of electric power from the AC external power source, controller 12 controls the electric machine 30 and ICE 32, either separately or in combination, to bulk charge the energy storage device 56, i.e., to charge the battery pack to a normal high (about 60% to 85%) SOC, and the controller uses the external AC power source 76 and charger 70 to provide the rest of the charge, i.e., from the normal high SOC to a high (about 90%) SOC.

In accordance with the provisions of the patent statutes, the preferred embodiment has been described. However, it should be noted that the alternate embodiments can be practiced otherwise than as specifically illustrated and described.

What is claimed is:

1. In a hybrid electric vehicle that includes an engine, motor- generator, and energy storage device, a power supply system accessible to an AC electric power source external to the vehicle, the system comprising:
   a charger coupled to said electric power source and the energy storage device for supplying DC electric power to the energy storage device from said electric power source; and
   a controller configured to use a state of charge of the energy storage device and a base electric power profile having regions including a fast active discharge region, a increasing active discharge region, an opportunistic passive region, an increasing active charge and a fast active charge region relating electric power and said state of charge, and to use the motor-generator and internal combustion engine to provide a bulk charge to the energy storage device in accordance with the base electric profile and a current state of charge.

2. The system of claim 1 wherein the controller is further configured to prevent the motor-generator and engine from charging the energy storage device when the region of operation in the base electric energy profile is a fast discharge region.

3. The system of claim 1 wherein the controller is further configured to minimize use of the motor-generator and internal combustion engine for charging the energy storage device when the region of operation in the base electric energy profile is an increasing active discharge region.

4. The system of claim 1 wherein the controller is further configured to prevent the motor-generator and internal combustion engine from discharging the energy storage device when the region of operation in the base electric power profile is a fast charge region.

5. The system of claim 1 wherein the controller is further configured to minimize use of the motor-generator and internal combustion engine for discharging the energy storage device when the region of operation in the base electric power profile is a fast charge region.

6. The system of claim 1 wherein the controller is further configured to use the motor-generator and internal combustion engine for discharging and charging the energy storage device when the region of operation in the base electric power profile is an opportunistic passive region.

7. In a hybrid electric vehicle that includes an engine, motor- generator, and energy storage device, a power supply system accessible to an AC electric power source external to the vehicle, the system comprising:
   a charger coupled to said electric power source and the energy storage device for supplying DC electric power and charging the energy storage device to a first state of charge from said electric power source; and
   a controller configured to use, when the vehicle is being driven and high- voltage battery cell voltage equalization is required, the motor-generator and internal combustion to charge the energy storage device to a higher state of charge than the first state of charge in accordance with a modified multiple- region electric power profile relative to a state of charge produced by a base electric power profile including a fast active discharge region, a increasing active discharge region, an opportunistic passive region, an increasing active charge and a fast active charge region.

8. The system of claim 7 wherein the controller is further configured to prevent the motor-generator and engine from charging the energy storage device when the region of operation in the modified electric energy profile is a fast discharge region.

9. The system of claim 7 wherein the controller is further configured to minimize use of the motor-generator and internal combustion engine for charging the energy storage device when the region of operation in the modified electric energy profile is an increasing active discharge region.

10. The system of claim 7 wherein the controller is further configured to prevent the motor-generator and internal combustion engine from discharging the energy storage device when the region of operation in the modified electric power profile is a fast charge region.

11. The system of claim 7 wherein the controller is further configured to minimize use of the motor-generator and internal combustion engine for discharging the energy storage device when the region of operation in the modified electric power profile is a fast charge region.

12. The system of claim 7 wherein the controller is further configured to use the motor-generator and internal combustion engine for discharging and charging the energy storage device when the region of operation in the modified electric power profile is an opportunistic passive region.

\* \* \* \* \*